US008893227B2

(12) United States Patent
Lu et al.

(10) Patent No.: US 8,893,227 B2
(45) Date of Patent: Nov. 18, 2014

(54) SYSTEM AND METHOD FOR PROVIDING PRIVACY IN SMART METER DEPLOYMENT (71) Applicant: Gemalto SA, Meudon (FR)

(72) Inventors: HongQian Karen Lu, Austin, TX (US); Aline Gouget, Paris (FR)

(73) Assignee: Gemalto SA, Meudon (FR)

(*) Notice: Subject to any disclaimer, the term of this patent is extended or adjusted under 35 U.S.C. 154(b) by 0 days.

(21) Appl. No.: 13/760,248

(22) Filed: Feb. 6, 2013

(65) Prior Publication Data
US 2014/0223526 A1  Aug. 7, 2014

(51) Int. Cl.
H04L 9/32 (2006.01)
H04L 9/00 (2006.01)
H04L 29/06 (2006.01)
G06Q 20/38 (2012.01)

(52) U.S. Cl.
CPC ............ H04L 63/08 (2013.01); H04L 63/0407 (2013.01); G06Q 20/383 (2013.01); H04L 63/0853 (2013.01)
USPC ............ 726/2; 726/4; 726/5; 726/6; 713/168; 713/169

(58) Field of Classification Search
CPC ..... H04L 63/0869; H04L 63/10; H04L 63/12; H04L 63/123; G06Q 20/3821; G06Q 20/40975; G06Q 20/085; G06Q 50/06
USPC ........ 726/1–9, 16–21, 34; 713/150, 168–172, 713/185; 705/63–64, 74–77, 412
See application file for complete search history.

(56) References Cited

U.S. PATENT DOCUMENTS 6,980,973 B1 * 12/2005 Karpenko ...................... 705/412
8,033,686 B2 * 10/2011 Recker et al. ............. 362/249.02
8,429,732 B2 *  4/2013 Kasahara et al. ................ 726/7
2011/0267202 A1    11/2011 Efthymiou et al.
2013/0124850 A1 *  5/2013 Gomez Marmol et al. ... 713/150

FOREIGN PATENT DOCUMENTS

WO    WO0190968 A1    11/2001

OTHER PUBLICATIONS

PCT/EP2014/051129, International Search Report, May 9, 2014, European Patent Office, P.B. 5818 Patentlaan 2, NL—2280 HV Rijswijk.
PCT/EP2014/051129, Written Opinion of the International Searching Authority, May 9, 2014, European Patent Office, P.B. 5818 Patentlaan 2, NL—2280 HV Rijswijk.

* cited by examiner

Primary Examiner — Hosuk Song
(74) Attorney, Agent, or Firm — The Jansson Firm; Pehr B. Jansson (57) ABSTRACT Privacy-preserving smart metering for a smart grid. Issuing a privacy-enhanced credential to a consumer node having smart meter. Operating the consumer node to associate an id with the credential and to use the id to report usage. Other systems and methods are disclosed.

10 Claims, 10 Drawing Sheets

SYSTEM AND METHOD FOR PROVIDING PRIVACY IN SMART METER DEPLOYMENT

BACKGROUND OF THE INVENTION

The present invention relates generally to utility meters and more particularly to privacy protection for smart meters.

An inherent objective for the power industry is to match power consumption to power generation as closely as possible and to optimally use available power generation capacities. It is very difficult for power companies to reach an efficient utilization rate because often peak demand cannot be matched to peak generation capacity.

In many markets, a supply-and-demand framework is used to achieve desired utilization patterns. For example, a restaurant may put certain items on sale early in the evening (e.g., Happy Hour) to incentivize restaurant patrons to arrive early, or an airline may lower prices for flights with undesirable departure and arrival times so as to encourage travelers to travel at those times instead of during peak hours, etc.

The power industry is particularly vulnerable to demand and supply fluctuations. For example, during hot afternoons, most consumers would run their air conditioners simultaneously. Similarly, many households have similar patterns for when major appliances such as ovens, dishwashers, and washing machines are used. On the flip-side, power generation, in particular power generation from solar and wind power, can be very dynamic and is therefore particularly difficult to tailor to demand fluctuations. Even if traditional power generation plants can be operated to follow demand, a retail electricity provider (REP) must be able to have enough power available to meet its highest demand periods as well. Thus, the power generation available to it will almost always be under-utilized as the peak demand is only likely to occur during a small portion of a few days per year.

Traditional electricity meters only measure the total power consumption of an account within a given time period and are unable to convey any information about consumption patterns at a particular metered location. Because total consumption is the only available information provided by these meters, it is very difficult for an REP to accurately measure or anticipate demand patterns by particular households or businesses. Furthermore, if an REP wanted to encourage consumption during certain times, e.g., to urge consumers to run appliances at night or to levy heavier charges for excessively cooling their homes during peak hours, a traditional meter that only measures total consumption would not support that type of charging mechanism.

One variety of traditional meters, so-called dual-rate meters, provide a limited amount of tariff flexibility. A rate-changer time switch keeps track of the time and switches between two registers depending on the time of day or night. While this makes it possible for an electricity provider to set different rates for different times, it does not provide enough granularity to effectively influence electricity demand. Furthermore, such meters do not provide a mechanism by which electricity rates may be changed as demand varies.

Though a retail electricity provider may have to pay increased rates to its suppliers during peak loads, it has no mechanism to transfer that increased cost to particular users who contributed to that peak load without penalizing those users who did not. The REP can only average out the increased cost of the peak load over its entire customer base. To ameliorate that unfairness, it is therefore also desirable to have a mechanism that provides a way to link levels of power usage to particularly costly periods and on to particular customers.

Smart meter and smart grid are complementary technologies that attempt to address the aforementioned desire to match consumption and generation. A smart meter collects energy usage information in small increments and transmits these measurements to the retail electricity provider. These increments may be every fifteen minutes, every 15 seconds, or even as often as every second. Retail energy providers, power generation companies, data warehouses, third-party service providers, and other entities desire access to this usage information, either in real-time or as a next-day report, for a variety of purposes. For example, utility companies trade and hedge energy contracts based on the real-time energy consumption and forecasts for next-day and near-future consumption. Fine-grained consumption patterns may be very useful in pricing such contracts. The retail energy provider may use the fine-grained usage information to bill the consumer at different rates based on time-of-day and quantities of consumption. Furthermore, the electricity market players may use the fine-grained information in determining future market prices for electricity.

A smart meter contains, at a minimum, the following connected components:
- a communications unit, e.g., an RF transceiver or network card, for communicating with other nodes located on a smart grid, such as a utility service provider and for communications to the utility consumers private network
- a mechanism for measuring utility consumption at the metered node
- a processor for executing program instructions controlling the operations of the smart meter
- a memory for storing meter readings and program instructions
- a remote switch for remotely cutting off the utility service
- access to in-house switches to turn off particular appliances during peak load (high price) periods A smart grid is a utility grid that makes use of available information, for example, as provided by smart meters including bidirectional communication with the smart meter, to more efficiently balance the load on a utility grid by providing consumers with incentives to change consumption patterns to take advantage of a varying rate schedule that reflects generation costs as well as demand. As an example, electricity is traditionally sold on the retail level at either one rate schedule or using two rates—a day rate and a night rate. However, wholesale electricity is priced in much smaller increments, e.g., they may vary by the hour or less. Thus, there is a disconnect between the cost of the electricity to the retail electricity provider and the retail prices that the same retail electricity provider may charge. In a smart grid, pricing structures may vary by demand and allow the retail utility service provider to incentivize consumers to practice certain utility usage behaviors and to have customer billing reflect the actual cost to the utility of the consumed commodity.

To even further aid the consumer in taking advantage of a smart rate structure, a smart meter may be provisioned with mechanisms for running certain appliances only during inexpensive periods. This may be particularly important as more and more consumers switch to electric cars who would then have the option to charge their cars when electricity is cheaper.

While smart meters and smart grids may provide some tangible benefits to electricity providers and consumers alike, there are several important negative considerations speaking against smart meter deployment, including risk of loss of privacy to the consumer, risk of electronic vandalism, and fraud.

It has been demonstrated that with fine-grained utility metering, particularly electricity, it is possible to analyze the consumption in a way that would infringe on the consumer's privacy. An example of the privacy concerns was illustrated by researchers Dario Carluccio and Stephan Brinkhaus who demonstrated that it is possible to analyze a consumer's usage pattern, using two-second relay patterns, to determine which movie a consumer has watched. Carluccio, Dario, and Stephan Brinkhaus, *Smart Hacking for Privacy*, talk presented at 28th Chaos Communication Congress (28C3), www*youtube*com/watch?v=YYe4SwQn2 GE, visited on Dec. 17, 2012.

Most smart meters contain mechanisms to switch off utility service to a metered site. This remote access presents a hacking opportunity in which an attacker could maliciously turn off power (or other utility service) at select sites or entire sub-grids. Naturally, such attacks could have dire security implications.

Furthermore, because smart meters may be network nodes on a relatively open network, there is a risk that the smart meters may be hacked to manipulate consumption data or rate schedules. For example, the researchers Carluccio and Brinkhaus also demonstrated this point by manipulating the data and returning a reading to the utility company showing a negative quantity of power consumption.

Microsoft research has proposed methods for privacy-friendly smart metering (Microsoft, "Privacy-Friendly Smart Metering," http://research*microsoft*com/en-us/projects/privacy_in_metering/[1], accessed on Dec. 3, 2012). The smart meter certifies the energy readings by digitally signing the data, which results in "certified readings." The meter can also encrypt the readings. To protect consumer privacy, the certified readings never leave the home boundary, which consists of the meter, user's computer, display, smart phone, and/or other user devices. The smart meter or the consumer devices perform the computations on the certified readings for various purposes, such as billing, and send the results to the energy provider or other third parties. In order to see the energy consumption, the consumers obtain the encryption keys from their readers and, hence, enable their devices to decrypt the data. The advantage of the Microsoft approach is protection of consumer privacy. However, in practice managing diverse client software for a potentially increasing number of applications on myriad client devices has been proven difficult.

[1] To avoid having impermissible functioning hyperlinks in this document, periods (".") in urls are replaced with asterisks ("*"). Thus, each asterisk should be replaced with a period when accessing the referenced site.

From the foregoing it will be apparent that while smart meters provide many desirable benefits there is still a need for an improved method to provide increased security to smart meters to enhance consumer privacy and to minimize the risk of fraud and malicious attacks that may impact security and welfare.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Many parties in the energy market desire access to detailed energy usage information for various purposes. However, many services, such as billing, forecast, and demand-response services, do not generally need to know the consumer identities corresponding to individual consumption recordings. Based on this fact, one embodiment of this invention disassociates the consumer identity information from the energy usage information. In one aspect of the technology described herein, a retail energy provider (REP) can consolidate energy usage information using a pseudonym and the bill is computed by the REP using the pseudonym, presuming there is one bill per pseudonym.

Figure 1:
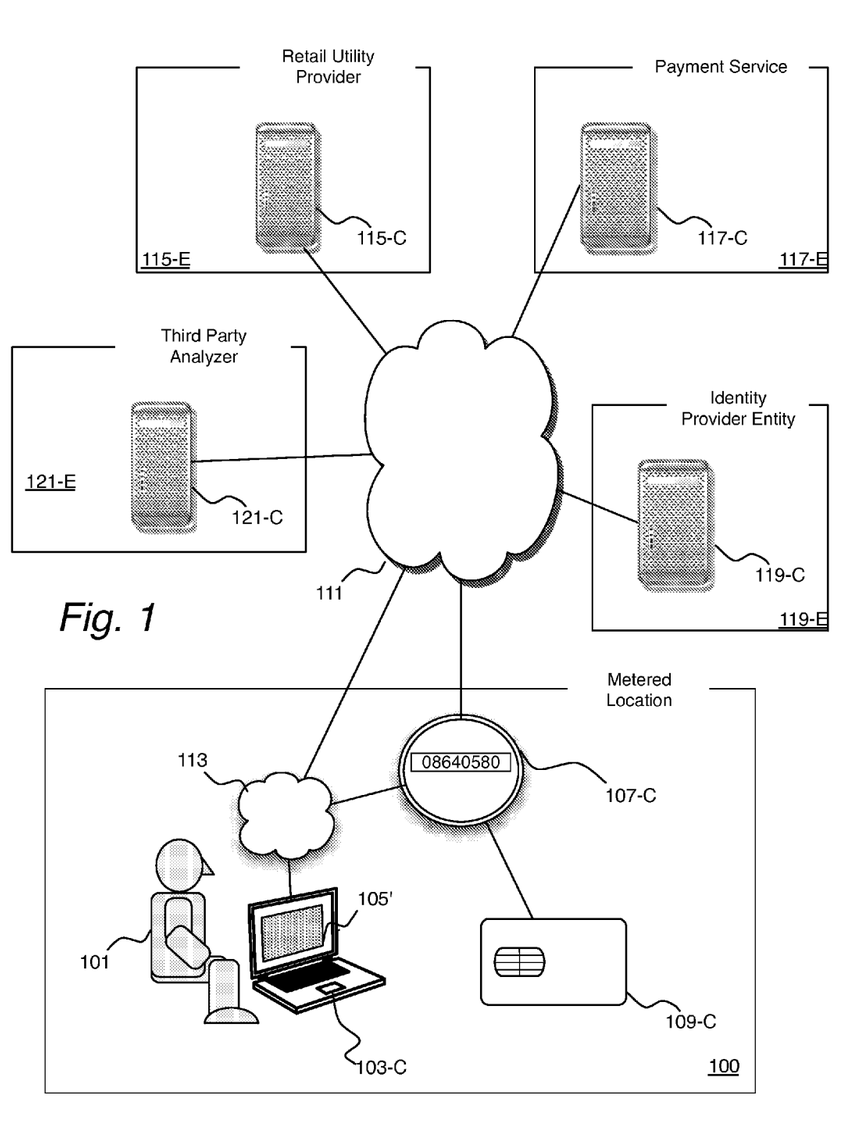
FIG. 1 is a network diagram illustrating a smart grid including households and businesses with smart meters as well as a third party credential issuer and a third party settlement provider.

FIG. 1 is a schematic illustration of hardware aspects of a network 111 connecting a metered location 100 to various server computers in a smart grid. The metered location 100 has a smart meter 107-C connected via a local area network (LAN) 113 to a host computer 103-C[2]. The network 111 may also connect the smart meter 107-C to one or more remote server computers. These remote server computers include a server computer 115-C of a retail utility provider (REP[3]) 115-E, (optionally) a server computer 117-C of a payment service 117-E, a server computer 119-C of an identity provider entity 119-E, and, optionally, a computer of a third party analyzer 121-E that may receive and analyze data obtained over the smart grid to which the smart meter 107 is connected. The host computer 103-C is operated by a user 101 who interacts with services running on one or more of the server computers via a web browser window 105 of a web browser 103-S (FIG. 2) executing on the host computer 103.

[2] In this description several related elements are referred to a n-E, n-C, and n-S, respectively. E stands for entity, C for computer, and S for software. Thus, n-E is the entity n-E that operates the computer n-C, which executes according to instructions n-S. For example, Retail Utility Provider (REP) 115-E operates a computer 115-C which executes a software of the REP 115-S. For ease of description, we sometimes refer to these elements by only the number n, e.g., service provider 115. Unless the context makes the contrary clear, this should typically be taken to mean that a reference to all three elements performing their respective roles, e.g., that the retail utility provider computer 115-C performs some action prescribed by the software in the retail utility software program 115-S.

[3] In one embodiment, the retail utility provider is an energy provider, e.g., an electrical power provider or a gas provider. Thus, the retail utility provider, in those embodiments, would be a retail energy provider. To avoid having multiple acronyms herein, we use the acronym REP to stand for retail electricity provider when strictly limited to electrical power, for, retail energy provider for a more general case, and even retail utility provider, for embodiments such as water metering.

The smart meter 107-C may be connected directly to the network 111 so that, for example, the REP 115 may communicate directly with the smart meter 107 or the smart meter 107 may be connected via the LAN 113 and receive its network connectivity that way. Conversely, the user 101 may need to receive information from the smart meter 107. That communication may be via the LAN 113, or if the smart meter 107 is not connected to the LAN 113, via the network 111.

According to one embodiment, the smart meter 107 is connected to a security device 109, for example a secure element embedded in the smart meter, a smart card connected to the smart meter (as is shown here), a smart card on a gateway computer providing the smart meter with connectivity to the network 111 or any variety of secure devices such as smart memory.

Not illustrated herein are smart appliances of the user 101, e.g., kitchen and laundry appliances, water heaters, etc. These appliances may be connected to the smart meter 107, to the LAN 113, or to the network 111, so as to receive information from the REP 115, to allow the appliances to be aware of tariff schedules or to be programmed via the host computer 103 to make good use of tariff variations.

Figure 2:
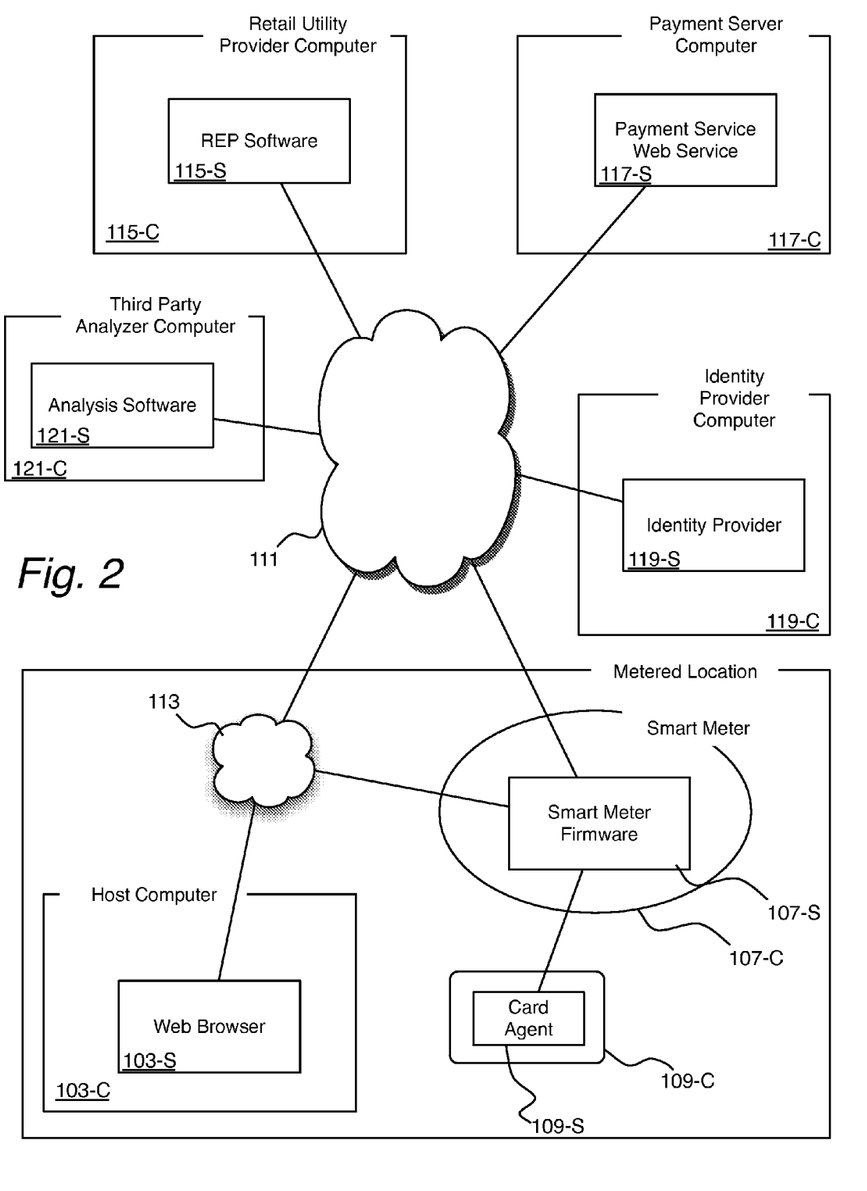
FIG. 2 is a schematic illustration of software programs corresponding to the hardware nodes of FIG. 1.

FIG. 2 is a schematic illustration of software programs corresponding to the hardware nodes of FIG. 1. As discussed herein, the user 101 may interact with a web service executing on the REP computer 115-C. The role of the payment service 117-S executing on the payment server computer 117-C and the identity provider 119-S executing on the identity provider computer 119-C are described herein below.

In the example scenario illustrated in FIG. 1 and described herein below, the security device 109 provides certain cryptographic operations on behalf of the smart meter 107, e.g., to cryptographically sign messages, to decrypt messages received from other parties, or to perform a cryptographic operation as part of a challenge-response authentication mechanism. The security device 109 also executes a card agent program 109-S which provides part of a function referred to herein below as meter agent and provides secure storage for a digital credential described in greater detail below.

Each of computers 103-C, 115-C, 117-C, 119-C, and 121-C may have typical components of a computer, e.g., a central processing unit capable of executing instructions stored on a storage device and memory used during execution of programs. Details of such architectures are generally known and do not need to be described in detail in the present discussion. In one scenario, the computers n-C have their respective software programs n-S stored on a storage device of the computer n-C. The operating systems of the computers n-C load the software programs n-S to be executed by the processors of the computers n-C. Herein, wherein language such as "web browser 103 sends a message X to service provider 115" is used, that language is to be taken to mean that the software instructions of the web browser 103-S are executed to cause the processor of the host computer 103-C to transmit the message X to the service provider server computer 115-C which operates under the instructions of the web service program 115-S.

Figure 3:
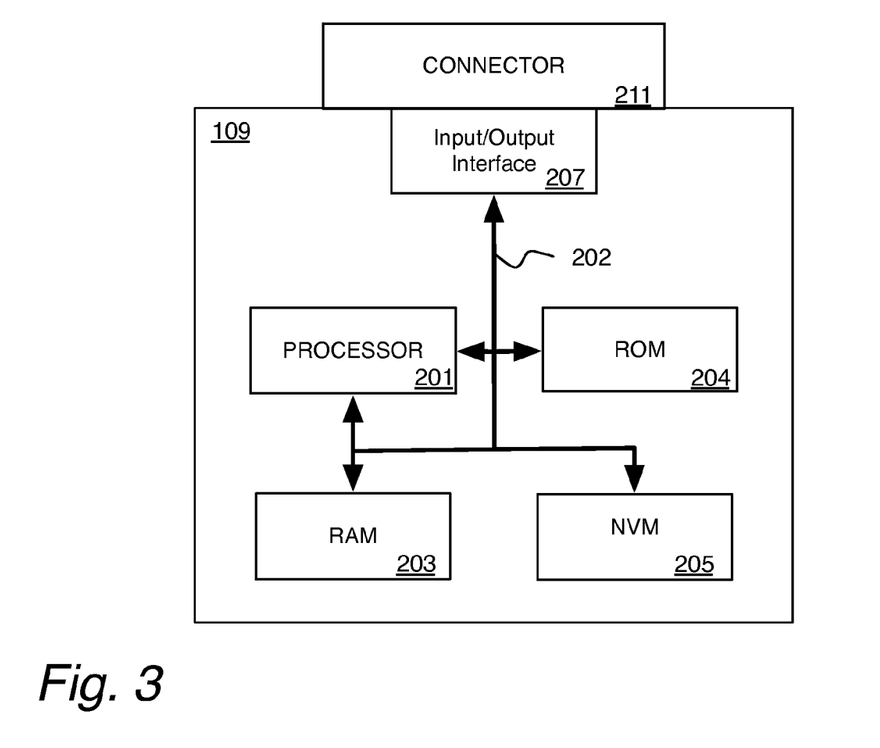
FIG. 3 is a block diagram illustrating a high-level view of the architecture of a smart card of FIG. 1.

FIG. 3 is a schematic illustration of a security device 109, for example, a smart card. The portable security device 109 may include a processor 201 connected via a bus 202 to a random access memory (RAM) 203, a read-only memory (ROM) 204, and a non-volatile memory (NVM) 205. The portable security device 109 further includes an input/output interface 207 for connecting the processor 201, again typically via the bus 202, to a connector 211 by which the portable security device 109 may be connected to the host computer 103.

Figure 4:
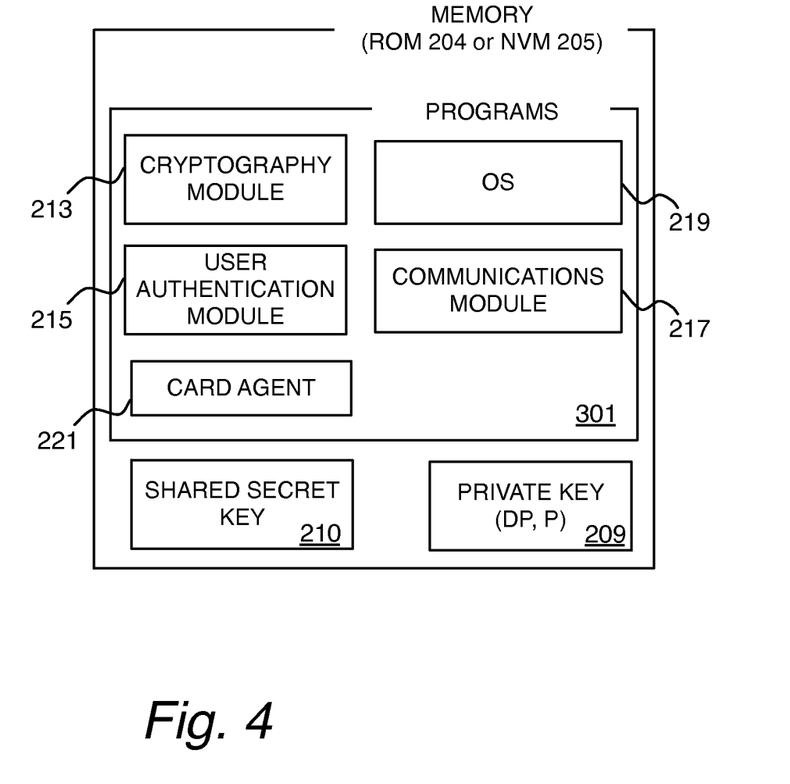
FIG. 4 is a block diagram illustrating the architectural organization of programs over the hardware components of the smart card FIG. 2, including illustrating a card agent stored in memory of the smart card to provide a smart meter with functionality to use privacy-enhancing credentials to anonymize usage reporting.

The NVM 205 and/or ROM 204 may include computer programs 301 as is illustrated in FIG. 4. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs as well as application programs loaded onto the portable security device 109. The NVM 205 or ROM 204 may also contain private data, such as a private key 209 or a shared secret key 210, stored either in basic form or in derived quantities.

The portable security device 109 programs 301 may include a cryptography module 213, an authentication module 215, a communications module 217, and the operating system OS 219. The portable security device 109 programs 301 may further include a card agent 221 for causing the portable security device 109 to perform the tasks of the portable security device 109 described herein such as interacting with the identity provider 119 to generate and make use of a privacy-preserving credential.

According to NIST's Electronic Authentication Guideline, a credential is "an object or data structure that authoritatively binds an identity (and optionally, additional attributes) to a token possessed and controlled by a subscriber" (NIST, "Electronic Authentication Guideline," NIST Special Publication 800-63-1 (Draft 3), June 2011). An authority, e.g. identity provider (IdP) 119, issues a credential to a user 101. Examples of credentials include username and password, X.509 certificate and the corresponding private key.

An anonymous credential allows a user to prove to a service provider (SP), e.g., the REP 115, that the credential contains the required attributes without revealing the information stored inside the credential. For example, the user can prove that she is a customer of the REP 115, having a smart meter 107 on the smart grid of the REP 115, and the consumption amount of the utility provided by the REP 115 without revealing her address, name, or even account number. The anonymous credential, hence, protects the user's privacy. An anonymous credential technology enables one to build a privacy-enhancing identity system that separates the credential issuance and credential usage, thus, permitting reporting of utility usage without revealing user identity.

The identity provider (IdP) 119 is the credential issuer. It is trusted by users 101, REP 115, and other interested third parties such as the payment service 117 or the third party data analyzer 121. The IdP 119 knows or can learn about users' identity information, and may verify the information.

Figure 5:
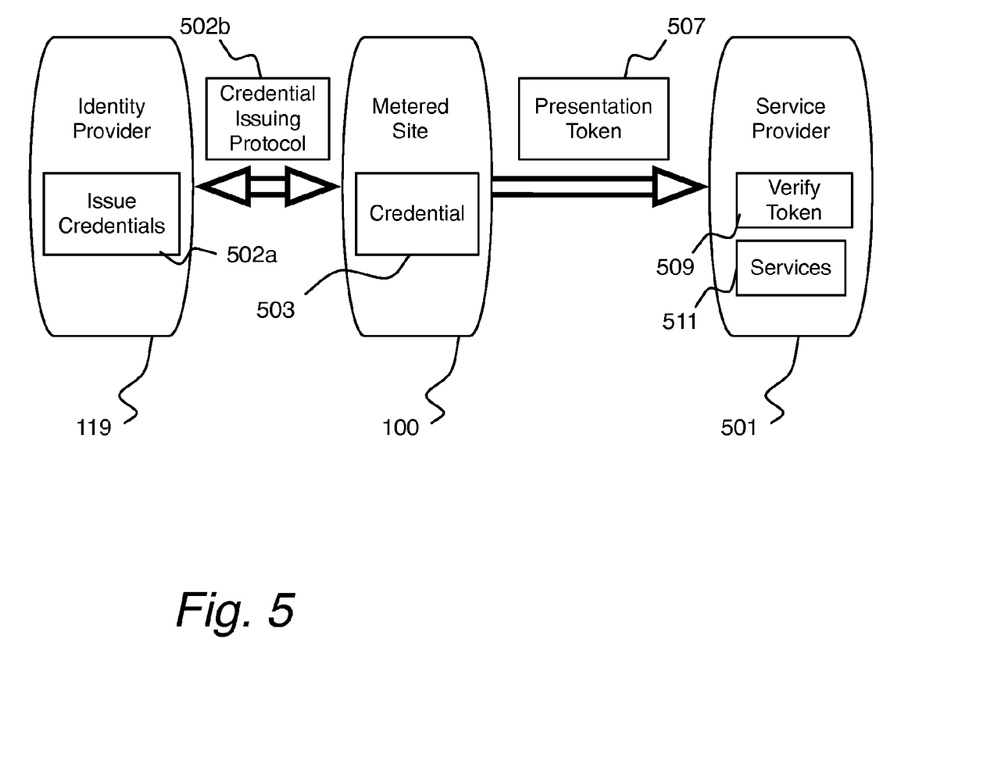
FIG. 5 is a block diagram illustrating use of privacy token to provide anonymized usage information to a utility service provider or other interested third party.

FIG. 5 is a block diagram illustrating the general case of issuance and use of a privacy-preserving credential. The identity provider (IdP) 119 issues credentials to end users, e.g., a smart meter 107 of a metered site 100. The credential issuance is an interactive process between the IdP 119 and the user (through the meter agent). The meter agent may be a combination of software known as the card agent 221 and software executing on the smart meter 107. At the end of the protocol, the security device (e.g., smart card) 109 of the metered site 100 has the credential token 503 and stores it in the secure memory of the security device 109.

The identity provider 119 issues the credential 503 in step 502a, by engaging in a credential issuing protocol 502b with the metered site 100. The metered site 100 stores the credential 503. In an embodiment in which a privacy-preserving credential is used to enhance privacy associated with smart meters, the metered site 100 may in effect be represented by the smart meter 107, in which case the security device 109 interacts on behalf of the user 101 and smart meter 107 to obtain a privacy-preserving credential from the identity provider 119. The metered site 100, represented by the security device 109, produces a presentation token 507 from the credential 503 and presents it to the service provider 501 (wherein the service provider 501 may be, for example, the REP 115, the third party analyzer 121, or the payment service 117). The presentation token 507 is generated based on the policy of the SP 501 and thus presents the proof required by the SP 501, the token being, for example, a UProve presentation proof, idemix proof, or a signed mERA-based credential. Next, the service provider 501 (which may be the REP 115, the payment service 117, or the third party data analyzer 121), verifies the presentation token, step 509, and in response (assuming the proof has been presented as desired) provides web services 511.

The service provider (SP) 501 verifies the credential before providing requested services 511, step 509, such as accepting a usage report from the smart meter 107 without any further identification of the metered site. SP 501 specifies its access control policy and the smart meter proves that it satisfies the policy requirements without presenting the credential directly. For this purpose, the smart meter presents a presentation token 509 that the SP 115 can verify.

The SP 115 may also need to check if the credential 505 is fresh (in case of a single use credential) or if the number of permitted uses has not already been exceeded (in case of a multi-use credential). The solution varies depending on whether the credential 505 is SP-specific or not.

The user 101 interacts with entities over the Internet via the web browser 103-C. The smart meter 107, particularly the smart card 109 of the smart meter 107, (through the meter agent) obtains a credential 503 from the IdP 119 and uses the credential 503 at various SPs 501 in the form of presentation tokens 507 created based on the particular policies of the SPs 501.

The user's security device 109 obtains the credential from the IdP 119 using a credential issuance protocol. At the end of the protocol, the security device 109 generates or obtains the credential.

The user 101 uses the credential when interacting with a SP 501. The smart card 109 generates a presentation token 507 from the credential 505 based on the requirements of the SP 501.

Figure 6:
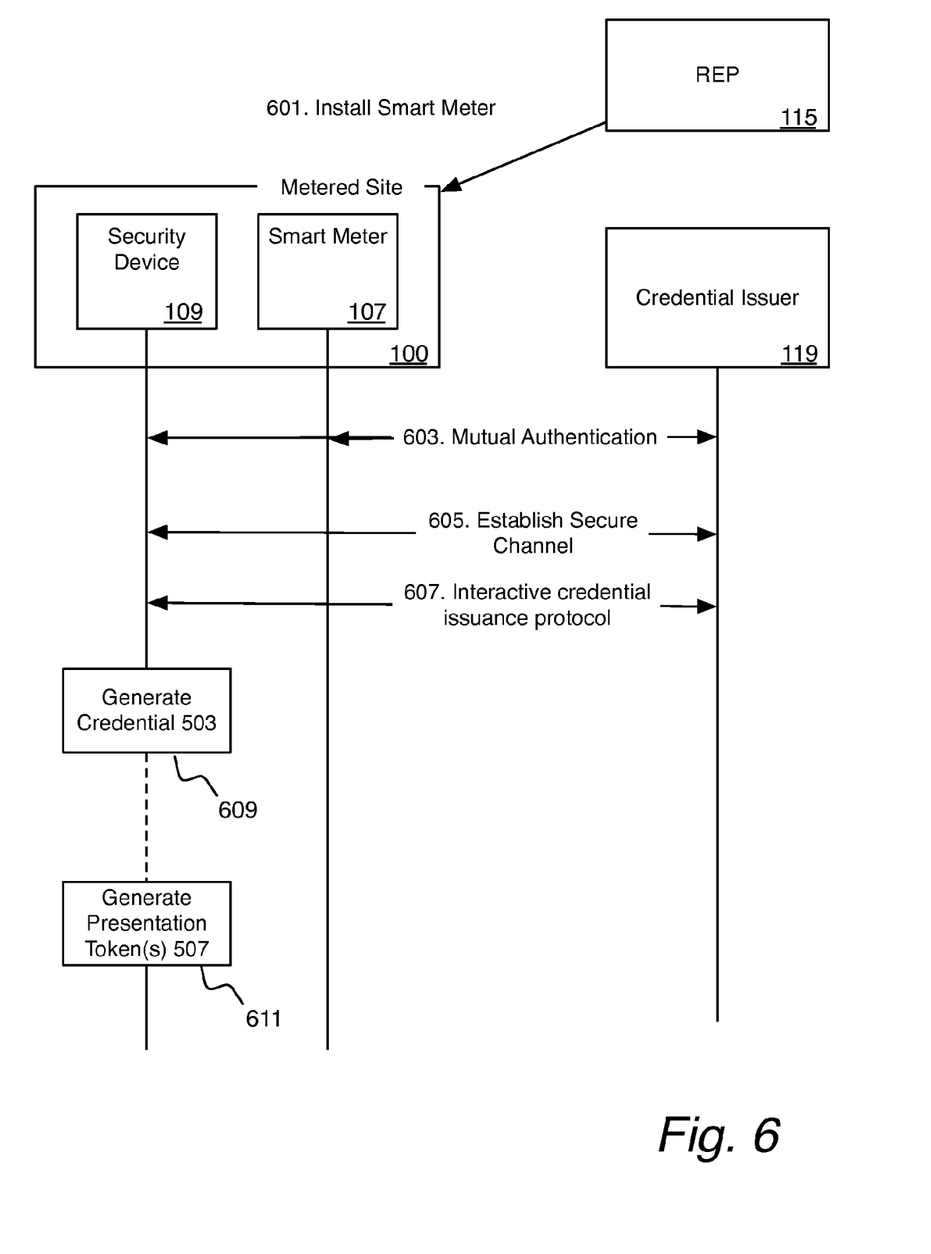
FIG. 6 is a timing sequence diagram illustrating the use of a security device to generate a credential token and one or more presentation tokens for use with third party service provider(s).

FIG. 6 is a timing sequence diagram illustrating the generation of a privacy-preserving credential 503 for use in a smart grid. The REP 115 installs (or causes to be installed) a smart meter 107 at the metered site 100.

A privacy-preserving credential 503 is then issued by the credential issuer 119. This may be the REP 115 or another trusted independent third party identity provider 119 in a process including the steps outlined in FIG. 6. The discussion that follows applies equally to both of these scenarios and while the discussion here is with respect to an identity provider 119 that is distinct from the REP 115 that is to be taken to include the embodiment in which the REP 115 is the identity provider.

The metered site 100 engages in a mutual authentication protocol with identity provider 119, step 603. The mutual authentication may be marshaled by the smart meter 107. However, the mutual authentication may use digital credentials, e.g., a digital certificate, stored securely on the security device 109.

The metered site 100 establishes a secure channel to the identity provider 119, step 605, for example, between the security device 109 and the identity provider 119.

The metered site 100, for example, represented by the security device 109, engages in an interactive credential issuance protocol, step 607.

The privacy-preserving credential 503 may or may not include the following:
  TokenId—which may be computed from other information
  Issuer Information, i.e., identifier for the identity provider 119 which issued the token, e.g., the issuer's public key
  Cryptographic parameters
  Issuer's signature
  Consumer Information, e.g., name, address, account number, payment information, phone number
  Smart Card Information, e.g., serial number, issuer
  Private key of the credential
  Public key of the credential On the other hand, the identity provider 119 that issued the credentials knows the following information: the consumer name, the identifier for the meter, and the identifier for the smart card of the metered site. However, the identity provider does not know the credential ID that the metered site 100 has associated with the credential generated through the credential issuance protocol, step 609, and would not be able to associate presentation tokens 507 with a particular consumer or metered site.

At the conclusion of the interactive credential issuance protocol, the metered site 100 generates the credential 503, step 609, and computes a credential identifier that the metered site 100, including the smart meter 107, may use as a pseudonym that does not reveal the actual identity of the metered site 100.

The metered site 100, e.g., the security device 109, may then generate one or more presentation tokens 507, step 611, from the privacy-preserving credential 503.

Figure 7:
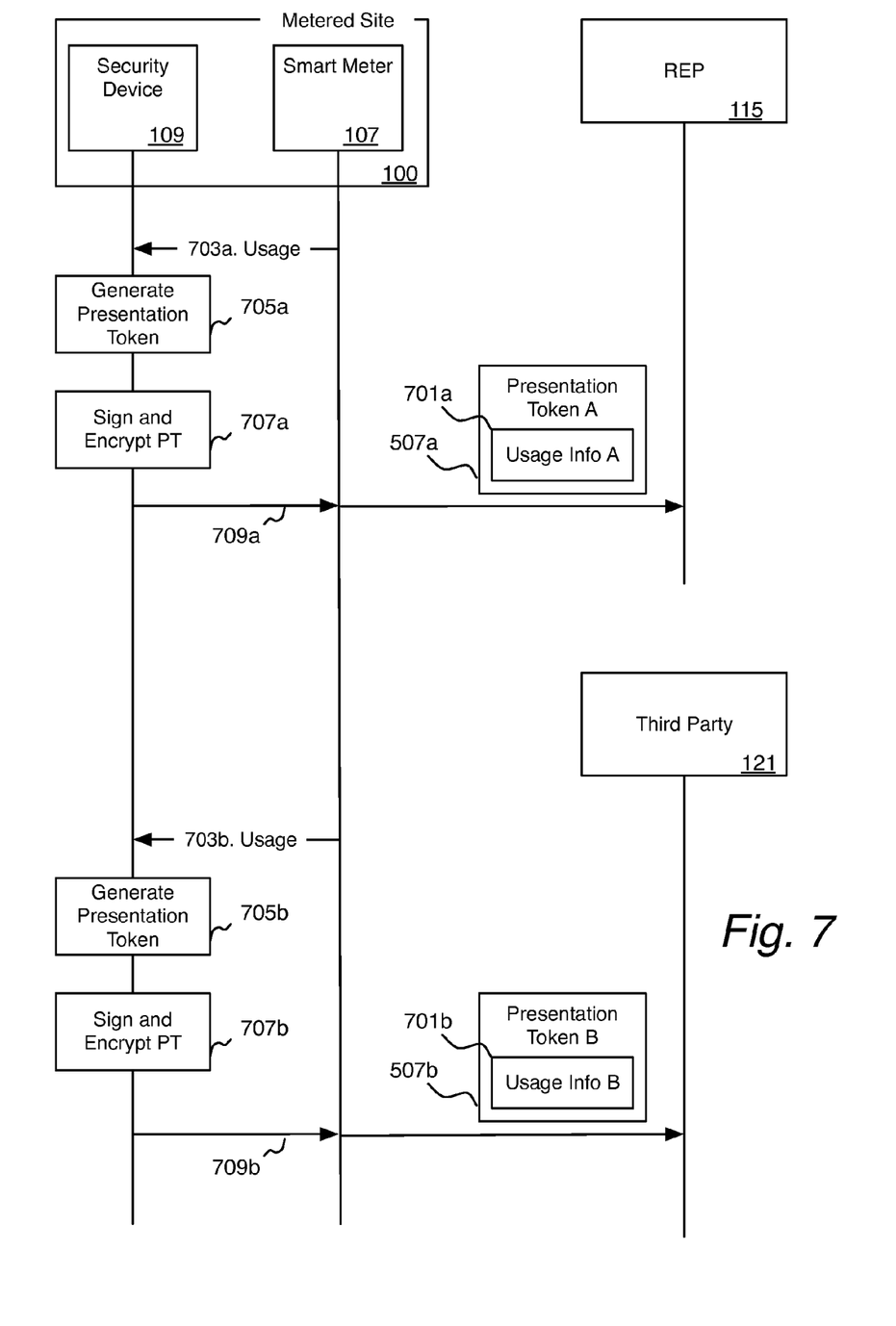
FIG. 7 is a timing sequence diagram illustrating the message flow between a metered site and both a retail utility service provider and a third party in which the metered site uses a privacy token to identify usage information and the retail utility service provider and third party use such privacy-token-identified usage information to generate usage analysis and/or utility bills for the metered site.

FIG. 7 is a high-level view illustrating a metered site 100 having a smart meter 107 which transmits usage information to two different parties. In the example of FIG. 7 these parties are the REP 115 and a third party 121 that may perform some analysis on the usage data. For the transmission of usage data to the REP 115, the smart meter 107 uses a first presentation token 507a in conjunction with usage information A 701a. However, for transmission of usage data to the third party 121, the smart meter 107 uses a second presentation token 507b in conjunction with usage information B 701b. The usage information A and B may be the same or different. The two servers receiving the usage information cannot readily link back to the same consumer from the presentation tokens because the presentation tokens do not bear information linking the presentation token to a particular metered site or consumer. A U-Prove credential (token) has a unique identifier. Thus, to prevent linking between service providers, the prover (i.e., here the smart card 109) has multiple U-Prove tokens corresponding to different service providers. The idemix token, however, can generate multiple pseudonyms. The service providers receiving different pseudonyms from the same token cannot link them. Thus, either scenario prevents linking of presentation tokens cryptographically even if service providers collude.

The usage measurement is sent by the smart meter 107 to the security device 109, step 703a. A separate usage measurement 703b may be sent separately for usage report B 701b. Or, both usage reports may be the same. For example, the REP 115 may require usage reports every 15 minutes whereas the analysis of the third party only requires reports every hour.

In each case, the security device generates a presentation token using the usage information, steps 705a and 705b and signs and encrypts the presentation tokens, steps 707a and 707b.

The signed and encrypted presentation tokens including the usage information is then transmitted to the respective servers, steps 709a and 709b.

Figure 8:
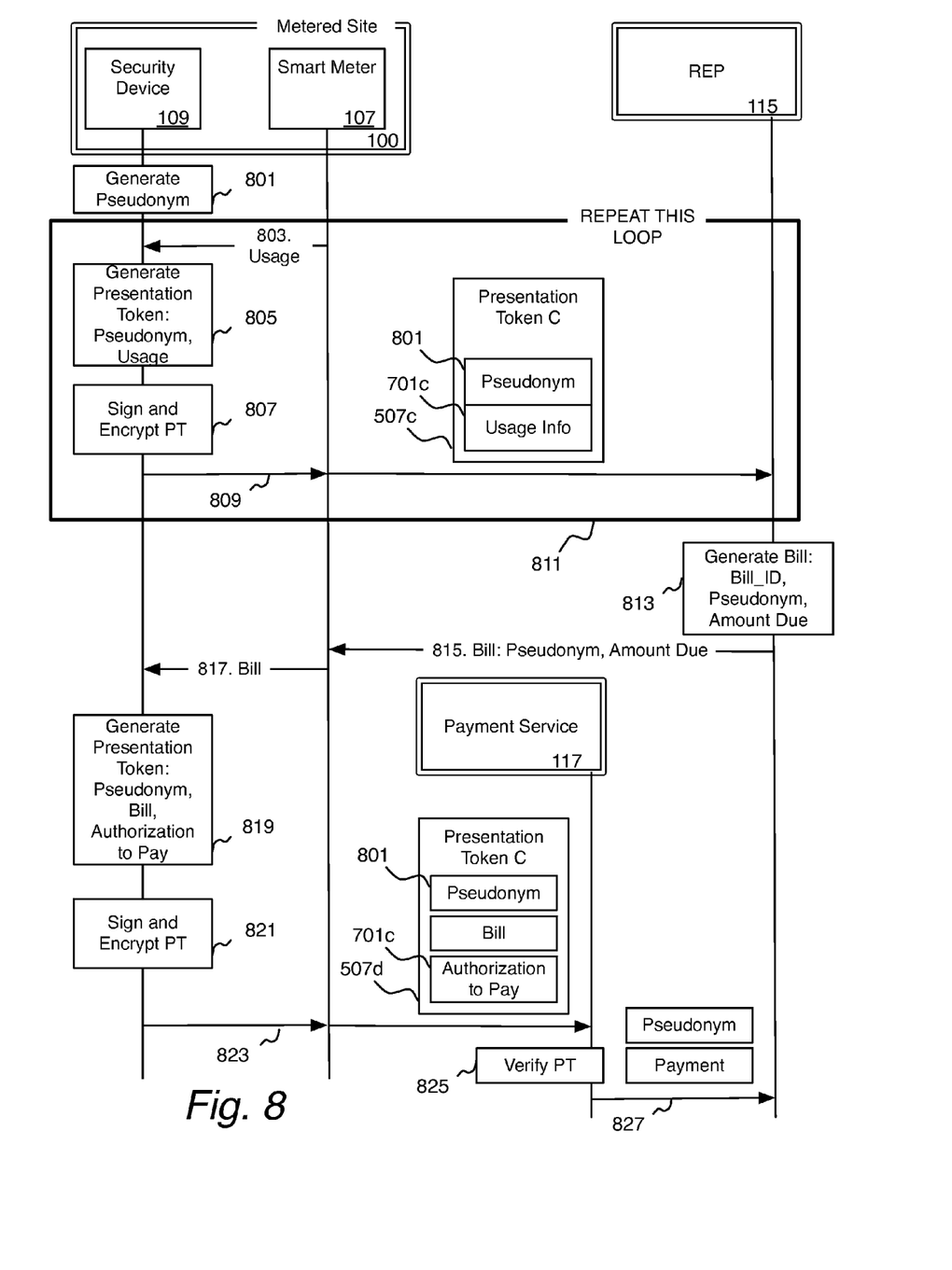
FIG. 8 is a timing sequence diagram illustrating the message flow between a metered site, a retail utility service provider and a third party settlement provider in which the metered site, the retail utility service provider and the third party settlement provider use a privacy token to link a bill to a metered site without revealing consumer-identifying information to either the utility provider or the third party settlement provider.

In an embodiment, the aforementioned mechanism of using a privacy-preserving credential and presentation tokens generated there from are used in conjunction with bill payment for utility services. FIG. 8 is a timing sequence diagram illustrating that mechanism at a high level.

Bill payment is performed by a payment service 117 which is authorized by the metered site 100 to make the payment on behalf of the metered site 100. To link the payment, the metered site associates a pseudonym with the credential 503. Thus, the security device 109 generates a pseudonym, step 801.

The security device 109 incorporates the pseudonym with the usage received from the smart meter, step 803, into a presentation token transmitted to the REP 115, step 805, and signs and encrypts the presentation token, step 807.

The signed and encrypted presentation token 507c is transmitted to the REP 115, step 809.

The steps of collecting usage information (803), generating a presentation token that incorporates the pseudonym with the usage information (805), encrypting the presentation token (807) and transmitting the presentation token to the REP 115 (809) is repeated (repeat loop 811) until the REP determines that the time has come for generating a bill using the usage information that has been collected in loop 811, linking a Bill_ID, the pseudonym and the amount due, step 813.

The bill is transmitted back to the metered site 100, step 815, and forwarded to the security device 109, step 817.

The security device 109 generates a presentation token from the pseudonym, the bill identifier, and an authorization to pay, step 819.

The security device signs and encrypts the presentation token, step 821.

The security device 109 transmits the presentation token 507d to the payment service 117, step 823.

The payment service 117 verifies the presentation token, step 825, and if all is OK, transmits the payment together with the pseudonym to the REP 115, step 827. The payment may be either from a pre-paid amount stored in the security device 109 as a digital wallet or by authorization for payment from some form of payment service, e.g., in the style of PayPal, direct transfer from a bank account, or credit card charged payment.

As discussed herein above, the bill from the REP 115 is transmitted to the meter. Depending on the method used to transfer the bill to the meter, the level of privacy protection varies.

For a "basic" level of privacy protection, only the link between a meter and a user has to be protected. In that case, the REP 115 is authorized to know the link between a meter 107 and a pseudonym, whereas the REP 115 should never learn the link between the user 101 and the pseudonym, or the link between a meter 107 and a user 101. According to one embodiment (called solution A below), to achieve that level of privacy the REP 115 authenticates the meter 107 before sending the bill to the meter 107.

For an "enhanced" level of privacy protection, both the link between a meter 107 and its corresponding pseudonym, and the link between a user 101 and the pseudonym 107 are to be protected. In that case, the REP 115 may know the link between the meter 107 and the user 101. One solution (called Solution B below) is that the REP 115 authenticates the meter 107 using an "anonymous authentication," e.g., the authentication method prevents the identification of a specific smart meter 107 by the REP 115 within the group of meters sharing the same authentication key.

Another embodiment (called Solution C) involves a third party whose role is to store pseudonym-meter pairs received from meters as well as pseudonym-bill pairs received from the REP 115. Optionally, the bill is encrypted and can be decrypted only by the meter associated with that pseudonym and possibly also by the REP 115. This third party serves as a gateway between the REP 115 and the meters 107.

Figure 9:
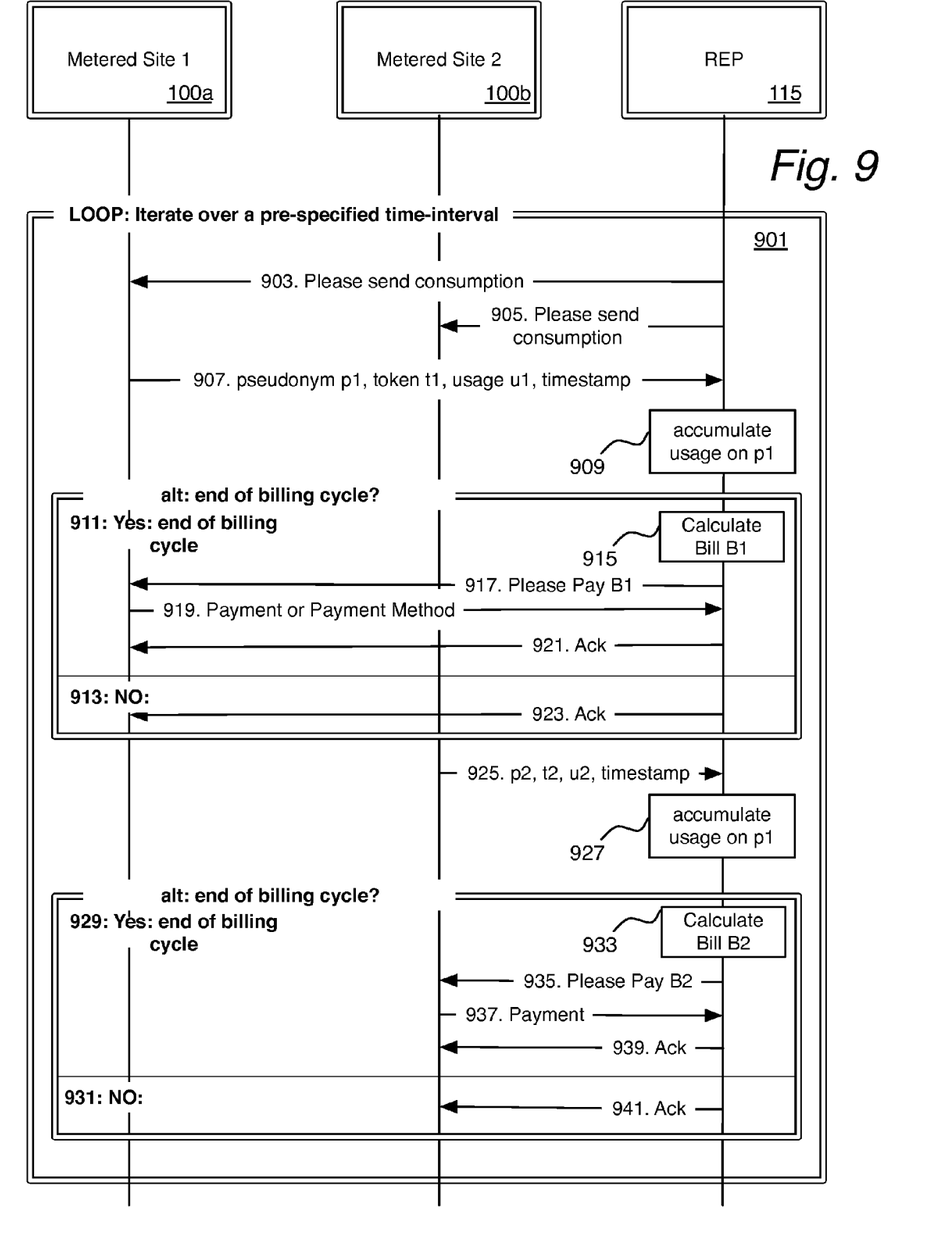
FIG. 9 is a timing sequence diagram illustrating a possible message flow between a retail utility provider and two metered sites in which privacy tokens are used in both assessing usage data and the billing and payment process.

FIG. 9 is a timing sequence diagram illustrating a possible message flow covering both Solutions A and B. In this message flow, only the authentication method and the privacy protection of the authentication method vary between the two solutions. A timestamp provides information to the REP 115 to allow the REP to detect and handle missing or repeated meter readings.

A loop 901 provides for iteration over a specified time interval defining the frequency of meter readings, e.g., every minute or every 10 minutes. The REP 115 requests all meters, here metered sites 1 and 2 (100a and 100b, respectively) to provide meter readings, messages 903 and 905.

The meter 100a replies with a message including the meter's pseudonym p1, a presentation token t1, usage reading u1, and timestamp, message 907.

The REP 115 accumulates the usage, step 909.

This presents two alternatives, end of billing cycle 911 or not end of billing cycle 913.

If it is the end billing cycle (911), the REP 115 calculates the bill B1, step 915 and transmits it to the metered site 100a, step 917.

The metered site 100a responds with a payment or payment information, step 919, and the REP 115 acknowledges the payment, step 921.

If not at the end of billing cycle (913), the REP simply acknowledges the receipt of the usage information, step 923.

Steps 925-941 illustrate that a similar message flow is executed for other metered sites 100.

Figure 10:
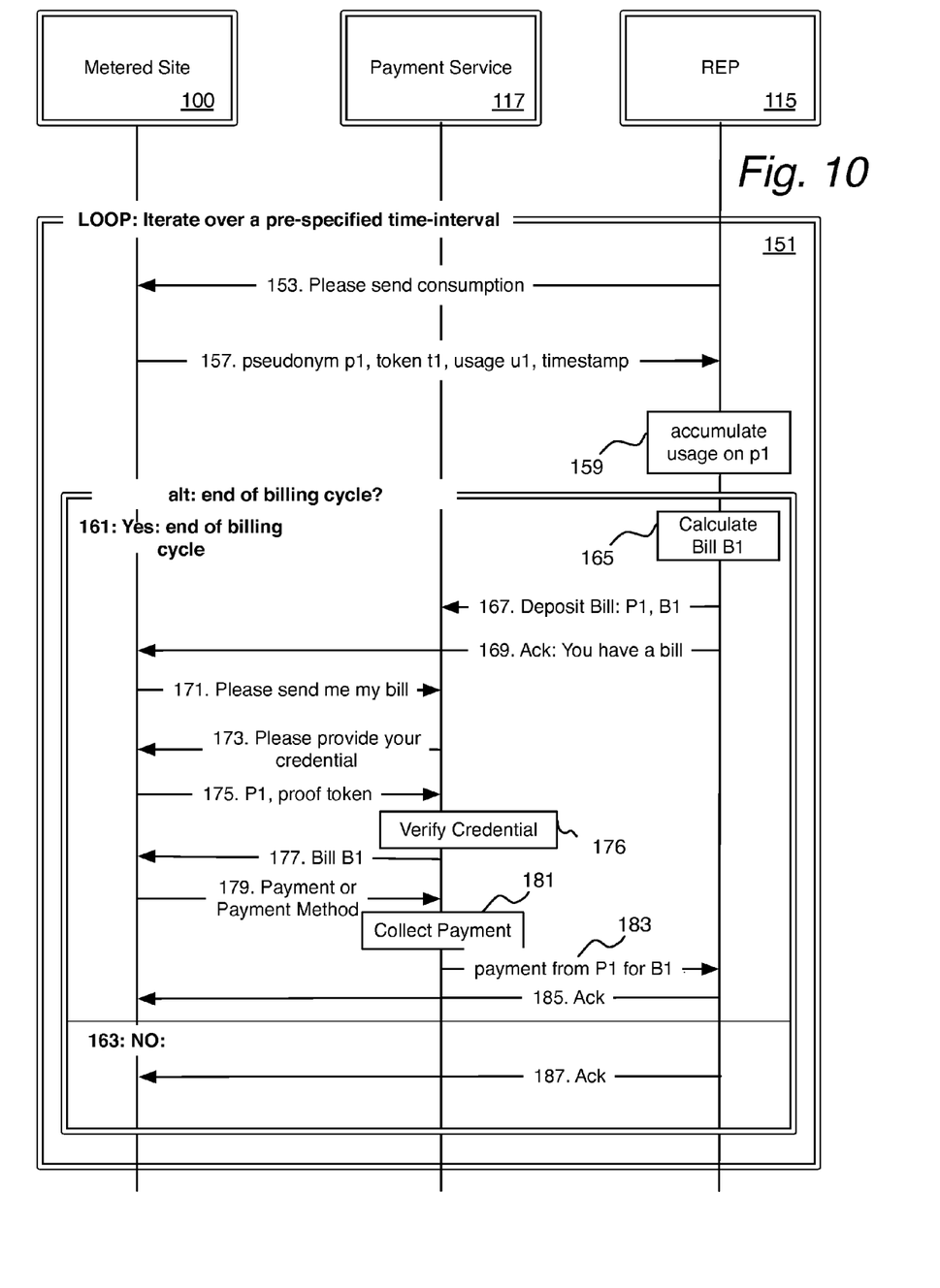
FIG. 10 is a timing sequence diagram illustrating a possible message flow between a retail utility provider, a metered site and a third party payment service.

FIG. 10 is a timing sequence diagram illustrating a possible message flow corresponding to Solution C. In this solution, the REP 115 knows the smart meters 107 but does not know which pseudonym corresponds to which meter.

As in FIG. 9, a loop 151 provides for iteration over a specified time interval defining the frequency of meter readings, e.g., every minute or every 10 minutes. The REP 115 requests all meters, here only showing one metered site 100, to provide meter readings, messages 153. The meter responds with a message including the meter's pseudonym p1, a presentation token t1, usage reading u1, and timestamp, message 157, and the REP 115 accumulates the usage, step 159.

This presents two alternatives, end of billing cycle 161 or not end of billing cycle 163.

If at the end billing cycle (161), the REP 115 calculates the bill B1, step 165 and transmits the bill to the payment service 117, step 167. The REP 115 also transmits a message to the metered site 100 informing the metered site that a bill has been generated for it, step 169.

The metered site 100 responds to the information that a bill has been generated by requesting the payment service 117 to send the bill to it, step 171.

The payment service 117 asks the metered site 100 to provide its credentials, step 173. The metered site 100 responds with its pseudonym p1, and the required proof in a presentation token based on the request from the payment provider, challenge/response-based authentication.

The payment service 117 verifies the credentials provided by the metered site 100, step 176, and if the credentials are satisfactory, transmits the bill to the metered site, step 177.

The metered site 100 responds with a direction to the payment service 117 to make payment or provides payment method instructions, step 179. The payment service 117 collects the payment, step 181, and transmits the payment to the REP 115 identifying the payment by the pseudonym P1 provided by the metered site 100 and the bill identifier B1, step 183. The REP 115 responds with an acknowledgement, step 185.

If not at the end of billing cycle (163), the REP simply acknowledges the receipt of the usage information, step 187.

From the foregoing it will be apparent that technology has been described which provides for protection of consumer identity in a smart grid using smart meters thereby alleviating one of the major obstacles and objections to widespread deployment of smart meters.

Although specific embodiments of the invention have been described and illustrated, the invention is not to be limited to the specific forms or arrangements of parts so described and illustrated. The invention is limited only by the claims.

We claim:

1. A method for providing secure, private and fraud-resistant smart meter information gathering and smart-meter-based applications using smart meters with secure cryptography modules in smart grid, comprising:
    issuing a privacy-enhanced credential to a consumer node comprising a smart meter;
    operating the consumer node to associate a credential id corresponding to the privacy-enhanced credential wherein the credential id acts as a pseudonym for the consumer without revealing that the credential id is associated with the consumer;
    operating the consumer node to create a presentation token from the privacy-enhanced credential which includes no consumer-identifying attributes from the privacy-enhanced credential and includes the credential id as a pseudonym for the consumer; and
    operating the consumer node to provide usage information using the presentation token and the credential id to a service provider node.

2. The method of claim 1, further comprising:
    operating the consumer node to repeatedly provide usage information using the presentation token and the credential id to a retail energy provider node;
    operating the retail energy provider, at the conclusion of a billing cycle, transmitting an electronic bill to the consumer node from the retail energy provider node, wherein the electronic bill is associated with the credential id; and
    operating the consumer node, in response to receiving the electronic bill, to pay the electronic bill using a privacy-preserving payment mechanism.

3. The method of claim 1 wherein the step of making a privacy-preserving payment comprises operating the consumer node to:
    transmit a bill payment using a second presentation token created by the consumer node and identified by the credential id to a payment transmitter; and
    operating the payment transmitter to forward payments and payment notifications identified by the credential id to the retail energy provider.

4. The method of claim 1 wherein the step of making a privacy-preserving payment further comprises operating the consumer node to:
    create the second presentation token from the privacy-enhanced credential.

5. The method of claim 1 wherein the second presentation token is the same presentation token as the first presentation token.

6. The method of claim 1 wherein the step of making an anonymous payment comprises operating the consumer node to:
    make a payment from a digital wallet.

7. The method of claim 1 further comprising:
    operating the retail energy provider node to digitally authenticate the smart meter of the consumer node prior to transmitting an electronic bill to the consumer node.

8. The method of claim 1 further comprising:
    operating the retail energy provider to authenticate the consumer node using anonymous authentication wherein the retail energy provider is assured of the consumer node being a node corresponding to a consumer of the retail energy provider having a smart meter associated with the retail energy provider.

9. The method of claim 8 wherein the anonymous authentication comprises:
    using a shared authentication credential to authenticate the consumer node to the retail energy provider wherein the shared authentication credential is shared among a group of consumer nodes each having a smart meter.

10. The method of claim 1 further comprising:
    operating a gateway node to:
        link the smart meter of the consumer node to the pseudonym;
        link the pseudonym to the electronic bill;

receive the electronic bill identified by the pseudonym from the retail energy provider;
match up the pseudonym with the smart meter corresponding to the pseudonym and forwarding the electronic bill to the smart meter corresponding to the pseudonym;
receive payment from the consumer node corresponding to the smart meter corresponding to the pseudonym;
forwarding the payment to the retail energy provider.

* * * * *